United States Patent
Hyoma et al.

(10) Patent No.: US 12,109,658 B2
(45) Date of Patent: Oct. 8, 2024

(54) MIG WELDING METHOD AND MIG WELDING DEVICE

(71) Applicant: IHI CORPORATION, Tokyo (JP)

(72) Inventors: Kengo Hyoma, Tokyo (JP); Yoshihiro Tanabe, Tokyo (JP); Yutaka Kodama, Tokyo (JP); Koutarou Inose, Tokyo (JP)

(73) Assignee: IHI CORPORATION, Tokyo (JP)

( * ) Notice: Subject to any disclaimer, the term of this patent is extended or adjusted under 35 U.S.C. 154(b) by 627 days.

(21) Appl. No.: 17/480,349

(22) Filed: Sep. 21, 2021

(65) Prior Publication Data
US 2022/0001479 A1 Jan. 6, 2022

Related U.S. Application Data

(63) Continuation of application No. PCT/JP2019/014853, filed on Apr. 3, 2019.

(51) Int. Cl.
*B23K 9/173* (2006.01)
*B23K 9/09* (2006.01)

(52) U.S. Cl.
CPC ............ *B23K 9/1735* (2013.01); *B23K 9/091* (2013.01)

(58) Field of Classification Search
CPC .......... B23K 9/073; B23K 9/09; B23K 9/184; B23K 9/1675; B23K 9/091; B23K 9/1735
See application file for complete search history.

(56) References Cited

U.S. PATENT DOCUMENTS

| 2015/0001185 A1* | 1/2015 | Kanemaru | B23K 9/173 219/75 |
| 2019/0262927 A1* | 8/2019 | Iwano | B23K 9/1675 |

FOREIGN PATENT DOCUMENTS

| JP | H11-147175 A | 6/1999 |
| JP | 2003-103368 A | 4/2003 |
| JP | 2003-181679 A | 7/2003 |
| JP | 2003-320479 A | 11/2003 |
| JP | 2004-223550 A | 8/2004 |
| JP | 2007-083303 A | 4/2007 |
| JP | 2013-158826 A | 8/2013 |
| JP | 2017-087245 A | 5/2017 |
| JP | 2019-072744 A | 5/2019 |

* cited by examiner

*Primary Examiner* — Brian W Jennison

(57) ABSTRACT

Two welding wires whose current values are individually variable are placed along a groove of steel plates, and two operations are repeated, the first operation including: passing substantially the same current through both welding wires; generating a cathode spot in front of a molten pool by one welding wire's arc on a welding-direction forward side; and cleaning the steel plates' surfaces by the arc, and the second operation including: passing a pulse current having a higher value than that of the welding wire through the other welding wire, so that a cathode spot is generated in the molten pool by each welding wire's arc to newly form a molten pool; and advancing both welding wires in the welding direction to move the cathode spot to the newly-formed molten pool, and at the same time performing welding within an area where oxides on the steel plates' surfaces are removed.

17 Claims, 2 Drawing Sheets

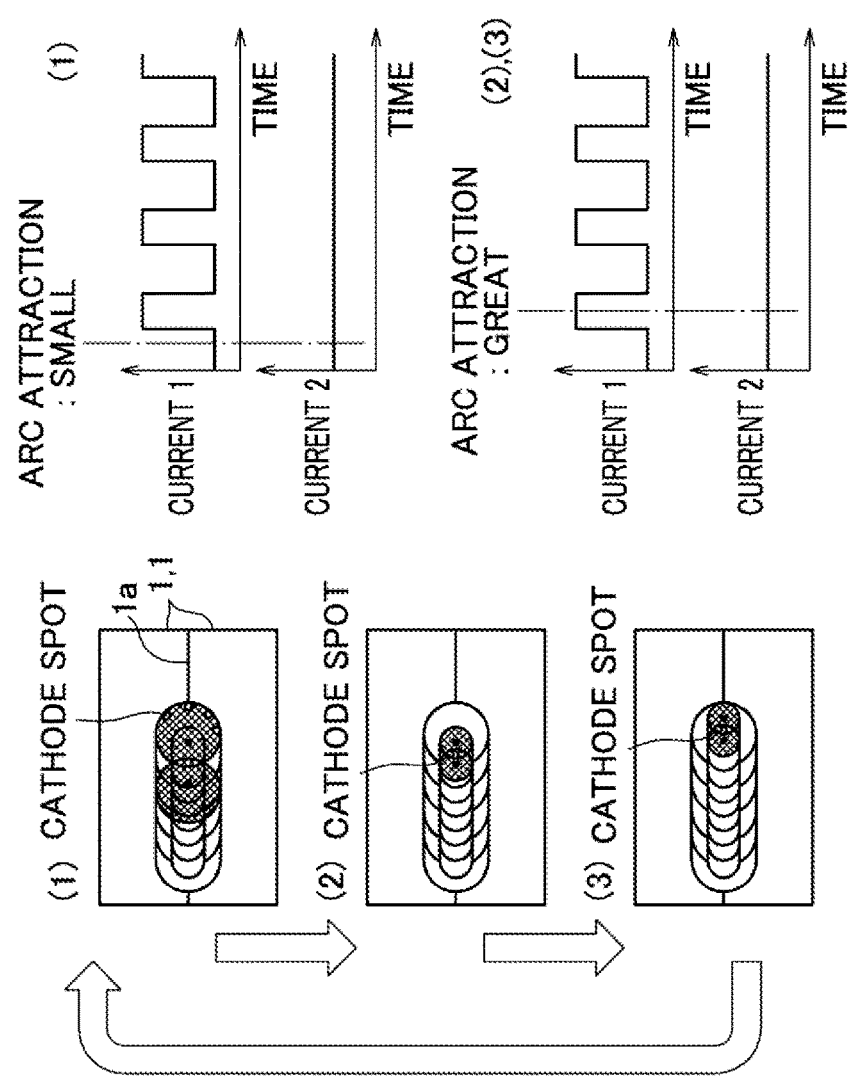
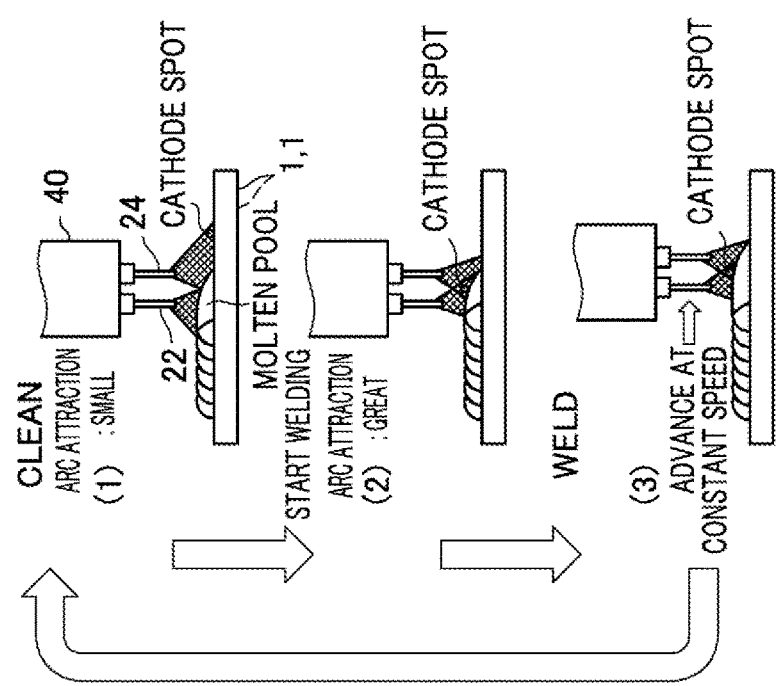

MIG WELDING METHOD AND MIG WELDING DEVICE

CROSS REFERENCE TO RELATED APPLICATIONS

This patent application is a continuation application of International Patent Application No. PCT/JP2019/014853 designating the United States of America and filed on Apr. 3, 2019, the contents of which are incorporated by reference herein in their entireties. The International Application was published in Japanese on Oct. 8, 2020, as International Publication No. WO 2020/202508 A1 under PCT Article 21(2).

TECHNICAL FIELD

Embodiments described herein relate to a MIG welding method and a MIG welding device, and particularly to a technique for improving welding quality in MIG welding.

BACKGROUND ART

MIG welding is conventionally known as one of welding techniques for metal members of steel structures and the like.

In MIG welding, metal members are welded by arc welding using a welding wire fed from a welding torch while being shielded from the atmosphere by a shield gas composed of an inert gas. This can achieve welding without being affected by oxygen in the air, concentrating heat on the welded portion, and welding with less distortion.

As the inert gas, argon gas (Ar) or helium gas (He) is used, and argon gas (Ar) is generally used in many cases since it is available more easily and more inexpensive. In MIG welding, for the reason that relatively good welding quality is ensured, welding is normally performed with the welding wire side as the positive electrode (+) and the metal member side as the negative electrode (−).

Here, when welding is performed with the welding wire side as the positive electrode (+) and the metal member side as the negative electrode (−), there is a problem in which the point where an arc is generated on a metal member, that is, the position of the cathode spot changes depending on the presence of oxides on the metal member and the density of dischargers, and the position is not fixed at one point, so that the arc is unstable, and as a result, the welding quality is unstable. This problem is known to be remarkable when only argon gas (Ar) (that is, 100% Ar) is used as the shield gas.

So, for example, there has been developed a technique such that the polarities of the welding wire side and the metal member side are reversed; in other words, the welding wire side is the negative electrode (−) and the metal member side is the positive electrode (+), and an element that easily forms an oxide is fixed to the surface of the welding wire, so that the oxide is intensively formed at the position of the metal member closest to the welding wire via the arc, and this substantially fixes the position of the cathode spot to stabilize the arc (Patent Document 1).

In addition, for example, a technique has been developed such that helium gas (He) is added to argon gas (Ar) as a shield gas, or carbon dioxide ($CO_2$) or oxygen ($O_2$) is further added for stabilizing an arc (Patent Document 2).

Here, in the technique disclosed in Patent Document 1, it is necessary to fix an element that easily forms an oxide on the surface of the welding wire, and this increases the cost of the welding wire, which is not preferable. Furthermore, it is known that, when welding is performed with the welding wire side as the negative electrode (−) and the metal member side as the positive electrode (+), the metal penetration during welding is insufficient and the welding bead is shallow.

Meanwhile, in the technique disclosed in Patent Document 2, helium gas (He) is added to argon gas (Ar) as a shield gas, but helium gas (He) is available more difficultly and more expensive than argon gas (Ar). Furthermore, it is known that, when carbon dioxide ($CO_2$) or oxygen ($O_2$) is added as a shield gas, the mechanical properties of the welded portion deteriorate.

Recently, as a technique for stabilizing an arc, an alternative to the above techniques has been developed (Patent Document 3).

The technique disclosed in Patent Document 3 is a composite welding method in which a TIG arc is generated on the TIG electrode side leading in the welding direction and a MIG arc is generated on the MIG electrode side trailing therein to weld the base metal. In this method, the current passed through the TIG electrode on the leading side is set to be higher than the current passed through the MIG electrode on the trailing side, and the cathode spot region of the MIG arc of the MIG electrode is kept within the molten pool formed by the TIG arc of the TIG electrode, for improving the stability of the arc.

RELATED ART DOCUMENT

Patent Document

Patent Document 1: Japanese Patent Application Laid-Open No. 2003-320479
Patent Document 2: Japanese Patent Application Laid-Open No. 2007-083303
Patent Document 3: Japanese Patent Application Laid-Open No. 2013-158826

SUMMARY OF THE DISCLOSURE

Problems to be Solved by the Disclosure

However, although the technique disclosed in Patent Document 3 can stabilize the arc, it has a problem in which the cathode spot region of the MIG arc of the MIG electrode located on the trailing side is kept in the molten pool formed by passing a high current through the TIG electrode on the leading side so that a high current is always required, and solving this problem has been a conventional problem.

The present disclosure has been made to solve such a problem, and an object of the present disclosure is to provide a MIG welding method and a MIG welding device capable of stabilizing an arc without requiring a high current while achieving cost reduction and improvement of welding quality.

Means for Solving the Problems

A first aspect of the present disclosure is a MIG welding method that forms a molten pool on a metal member to be welded, the MIG welding method including: placing a pair of MIG electrodes whose current values are individually variable and that include at least one MIG electrode through which a pulse current is passed; and repeating a first operation and a second operation, the first operation including passing a current having substantially the same current value through the pair of MIG electrodes while the pair of MIG electrodes is moved in a welding direction, so that an arc of a first MIG electrode of the pair of MIG electrodes generates a cathode spot in front of the molten pool in a moving direction, and the arc removes an oxide on a surface of the metal member to be welded; the second operation including: passing a pulse current having a higher current value than that of the first MIG electrode through a second MIG electrode of the pair of MIG electrodes, so that cathode spots are each generated within the molten pool to newly form a molten pool; and performing welding within an area while a cathode spot is moved to the newly formed molten pool, the area being an area where the oxide on the surface of the metal member to be welded is removed.

The MIG welding method and the MIG welding device of the present disclosure utilize a property in which a cathode spot where an arc is generated is easily formed at a portion having an oxide, that is, a property in which a cathode spot is less likely to be generated in the order of (1) oxide>(2) molten pool>(3) cleaning surface. Removing (cleaning) the oxide in the area to be subsequently welded on the surface of the metal member to be welded in advance using an arc intentionally makes the area less likely to have the cathode spot generated therein than in the molten pool. After that, in welding the cleaned area, the generation position of the cathode spot is controlled so that the cathode spot is surely generated concentratedly in the molten pool.

The control of the generation position of the cathode spot utilizes the change of each magnetic field around the arc generated at each of the two MIG electrodes in passing currents through the pair of MIG electrodes at the same time.

Specifically, for example, when an electric current is simultaneously passed through a pair of MIG electrodes placed along the welding line of the metal member to be welded, an arc is generated for each of the MIG electrodes to form a molten pool on the surface of the metal member to be welded. At this time, a magnetic field is generated around each arc according to the "right-handed screw rule", so that each magnetic field acts on the other arc as an attraction.

When a pulse current is passed through, for example, the MIG electrode on the welding direction backward side of the pair of MIG electrodes, and this pulse current is the base current, the magnetic field strength generated by the arc of the MIG electrode on the welding direction backward side is small. Therefore, the force (arc attraction) that attracts the arc of the MIG electrode on the welding direction forward side to the backward side is small. When this arc attraction is small, the arc spreads, so that a cathode spot is generated on the surface of the metal member to be welded in the area to be subsequently welded (in front of the molten pool), which acts as cleaning.

On the other hand, for example, when a pulse current is passed through the MIG electrode on the welding direction backward side of the pair of MIG electrodes and this pulse current is the peak current, the magnetic field strength generated by the arc of the MIG electrode on the welding direction backward side is great. Therefore, the force (arc attraction) that attracts the arc of the MIG electrode on the welding direction forward side to the backward side is great. When this arc attraction is great, the arc is contracted, so that the arc generated at the first MIG electrode on the welding direction forward side is attracted to the arc generated at the second MIG electrode on the backward side, and the cathode spots are generated concentratedly in the molten pool. As a result, stable and highly wettable welding is achieved.

At this time, a high current is not required because the amount of increase in the pulse current passed through the second MIG electrode on the welding direction backward side is only the amount that contributes to welding. In addition, the pair of MIG electrodes are both consumable electrodes, so that the droplet transfer of both MIG electrodes achieves welding with high efficiency.

Effects of the Disclosure

According to the MIG welding method and the MIG welding device of the present disclosure, it is possible to stabilize the arc without requiring a high current, and it is possible to perform low-cost, high-quality, stable and highly wettable welding with high efficiency.

BRIEF DESCRIPTION OF THE DRAWINGS

FIG. 2A is a side view of a steel plate and a welding torch showing a welding procedure of arc welding by a MIG welding method according to one embodiment of the present disclosure in chronological order from (1) to (3).

FIG. 2B is a top view showing the steel plate and the welding torch showing the welding procedure of arc welding by the MIG welding method according to the one embodiment of the present disclosure in chronological order corresponding to (1) to (3) of FIG. 2A.

FIG. 2C is a diagram showing chronological change in current value applied to welding wires during arc welding by the MIG welding method according to the one embodiment of the present disclosure in chronological order corresponding to (1) to (3) of FIG. 2A.

Mode for Carrying Out the Disclosure

Figure 1:
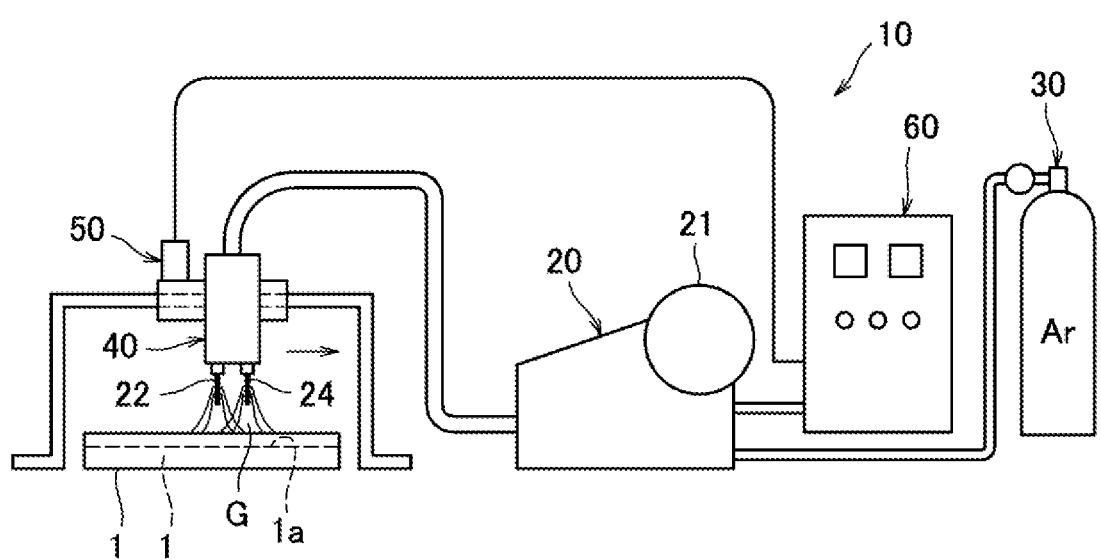
FIG. 1 is an overall configuration diagram showing a MIG welding device for performing a MIG welding method according to the present disclosure and a pair of steel plates for which MIG welding is performed.

Hereinafter, embodiments of the present disclosure is to be described with reference to the drawings.

FIG. 1 is an overall configuration diagram showing a MIG welding device 10 for performing a MIG welding method according to one embodiment of the present disclosure and a pair of steel plates (metal members to be welded) 1, 1 for which MIG welding is performed.

The steel plates 1, 1 are set, for example, with the side edges abutting each other so as to form an I-shaped groove 1a with a predetermined groove gap between the side edges of the steel plates 1, 1.

The MIG welding device 10 includes a welding wire supply unit 20 that supplies a pair of welding wires (MIG electrodes) 22, 24 that are consumable electrodes, and a shield gas supply unit 30 that supplies the shield gas G. In addition, the MIG welding device 10 includes a welding torch 40 which is connected to the welding wire supply unit 20 and the shield gas supply unit 30 to inject the shield gas G and to feed the welding wires 22, 24, and a moving unit 50 that moves the welding torch 40 along the I-shaped groove 1a of the steel plates 1, 1. Furthermore, the MIG welding device 10 includes a control unit 60 that controls the operation of the moving unit 50 in addition to various controls for arc welding such as the current applied to the welding wires 22, 24 and the supply speed of the welding wires 22, 24.

As the shield gas G supplied from the shield gas supply unit 30, a 100% inert gas is used. Here, for example, it is desirable to use argon gas (Ar), and it is more desirable to use 100% Ar because it is available more easily and more inexpensive than other inert gases.

The welding wire supply unit 20 includes a welding wire coil 21 having the welding wires 22, 24 wound therein (only the welding wire coil 21 for the welding wire 22 is shown), and it is formed to be capable of continuously supplying the welding wires 22, 24 from the welding wire coil 21.

The welding torch 40 is formed to hold the welding wires 22, 24 supplied from the welding wire supply unit 20 along the I-shaped groove 1a of the steel plates 1, 1, and to be capable of constantly sticking each tip of the welding wires 22, 24 out of the welding torch 40. The amount of sticking the tips of the welding wires 22, 24 out of the welding torch 40 is appropriately controlled by the control unit 60 according to the voltage, current, and the like at the tips of the welding wires 22, 24.

In this embodiment, the pair of welding wires 22, 24 are placed along the I-shaped groove 1a (welding line) of the steel plates 1, 1. However, the pair of welding wires 22, 24 need only be placed forward and backward of each other with respect to the welding direction, and the pair of welding wires 22, 24 need not necessarily be placed along the I-shaped groove 1a.

Furthermore, in this embodiment, description is to be made of a case in which the welding wires 22, 24 are set perpendicular to the steel plates 1, 1, as an example, but the welding wires 22, 24 may be tilted independently with respect to the steel plates 1, 1.

In tilting the welding wires 22, 24 with respect to the steel plates 1, 1, for example, tilting them toward the forward side with the tips being directed backward in the welding direction makes cleaning difficult, and contrarily, tilting them toward the backward side with the tips being directed forward in the welding direction makes cleaning easy, but reduces the amount of penetration.

Therefore, the direction and angle in tilting the welding wires 22, 24 are appropriately determined according to the welding specifications such as the materials of metal members to be welded.

The moving unit 50 can move the welding torch 40 forward and backward along the I-shaped groove 1a of the steel plates 1, 1, and it can also change the moving speed of the welding torch 40 depending on a command from the control unit 60. At this time, the moving unit 50 may be formed: to operate the welding torch 40 to cause the welding wires 22, 24 to perform weaving; and/or to move the welding wires 22, 24 closer to and away from the steel plates 1, 1.

As described above, the control unit 60 individually controls the energization of each of the pair of welding wires 22, 24, and it has the function of issuing a command to the moving unit 50 to advance the welding torch 40 along the I-shaped groove 1a.

In addition, the MIG welding device 10 performs welding with the welding wires 22, 24 sides having a positive electrode (+) and the steel plates 1, 1 sides having a negative electrode (−). Thus, when the welding wires 22, 24 sides are the positive electrodes (+) and the steel plates 1, 1 sides are the negative electrodes (−), relatively good welding quality is achieved compared with the contrary case in which the welding wires 22, 24 sides are the negative electrodes (−) and the steel plates 1, 1 sides are the positive electrodes (+).

A MIG welding method by the MIG welding device 10 formed as described above is to be described below.

With reference to FIGS. 2A and 2B, welding procedure for arc welding by the MIG welding method according to one embodiment of the present disclosure is shown in chronological order from (1) to (3). FIG. 2A is a side view of steel plates 1, 1 and a welding torch 40, while FIG. 2B is a top view of the steel plates 1, 1 and the welding torch 40.

In addition, with reference to FIG. 2C, chronological changes of the current values applied to respective welding wires 22, 24, are shown in chronological order corresponding to (1) to (3) of FIGS. 2A and 2B. This is to be described below with reference to FIGS. 2A to 2C.

First, the tip of the welding wire 22 (a second MIG electrode) located on the welding direction backward side is positioned at the welding start position of the I-shaped groove 1a of the steel plates 1, 1, and a pulse current is passed only through the welding wire 22 to start welding. When the welding starts, a molten pool begins to be formed in the I-shaped groove 1a due to droplet transfer at the tip of the welding wire 22.

Once the molten pool is formed at the welding start position of the I-shaped groove 1a of the steel plates 1, 1, as shown in each (1) of FIGS. 2A and 2B, according to a command from the control unit 60, a pulse current is passed through the welding wire 22 and a steady current is passed through the welding wire 24 (a first MIG electrode) (a first operation and a first control). At this time, as shown in (1) of FIG. 2C, both the base current of the pulse current 1 passed through the welding wire 22 and the current 2 passed through the welding wire 24 are of the same or approximately the same (substantially the same) current values.

The current 2 passed through the welding wire 24 is a current having a current value that generates an arc but does not easily form a molten pool in the steel plates 1, 1, and at the stage shown in (1) of FIG. 2C, the pulse current 1 passed through the welding wire 22 is also a current having a current value that does not easily form a molten pool.

When electric current is passed through the welding wires 22, 24 at the same time in this way, an arc is generated at each of the welding wire 22 and the welding wire 24, and magnetic field is generated around each arc according to the "right-handed screw rule" so that each magnetic field acts on the other arc as an attraction. However, when the pulse current of the welding wire 22 located on the welding direction backward side is the base current and the current values on the dash dotted line of the welding wires 22, 24 are the same or approximately the same, the magnetic field strength generated by the arc of the welding wire 22 is small. Therefore, the force that attracts the arc of the welding wire 24 on the welding direction forward side to the backward side is small.

This causes the arc generated by the welding wire 22 likely to generate a cathode spot at an oxide present on the lateral side of the molten pool on the welding line on the surface of the steel plates 1, 1, and causes the arc generated by the welding wire 24 likely to generate a cathode spot at an oxide present on the welding direction forward side of the molten pool on the welding line on the surface of the steel plates 1, 1. Here, in FIGS. 2A and 2B, the area where the arc is generated is represented by shading, and the cathode spots are represented by white circles as examples. As shown in each (1) of FIGS. 2A and 2B, cathode spots scatters on the welding direction forward side and lateral side of the molten pool on the welding line on the surface of the steel plates 1, 1, and oxides are removed within the area where the arc represented by the shading is generated so that the surfaces of the steel plates 1, 1 are cleaned.

When the surfaces of the steel plates 1, 1 are cleaned, as shown in each (2) of FIGS. 2A and 2B, the current 2 passed through the welding wire 24, which is the first MIG electrode, is constant according to the command from the control unit 60. Then, from this state, the peak current of the pulse current 1 passed through the welding wire 22, which is the second MIG electrode, is increased to the current value that contributes to welding (second operation and second control).

When the peak current of the pulse current 1 passed through the welding wire 22 is increased to the current value that contributes to welding in this way (when the current values on the dash dotted line in (2) of FIG. 2C of the welding wires 22, 24 are differentiated from each other), the magnetic field strength generated by the arc of the welding wire 22 on the welding direction backward side increases. This increases the force that attracts the arc of the welding wire 24 on the welding direction forward side to the backward side to attract the arc generated by the welding wire 24 to the arc generated by the welding wire 22 and bring the former arc closer to the molten pool.

This creates a tendency in which the cathode spot is generated in the molten pool as compared with the cleaned portion of the surface of the steel plates 1, 1 to concentrate the cathode spots or the arc generation points into the molten pool for both the welding wire 22 and the welding wire 24, thereby beginning to form a new molten pool and again starting welding. In other words, a molten pool begins to be formed in the I-shaped groove 1a due to the droplet transfer at the tips of the welding wires 22, 24.

Then, as shown in each (3) of FIGS. 2A and 2B, while the pulse current 1 passed through the welding wire 22 is kept at the current value increased to contribute to welding, the moving unit 50 advances the welding torch 40 constantly at a normal advancing speed in the welding direction to perform welding according to a command from the control unit 60 (second operation and second control). When the tip of the welding wire 24 reaches the end of the cleaned area on the surface of the steel plates 1, 1, the process returns to each (1) of FIGS. 2A and 2B. After that, based on the pulse current waveforms shown in (1) of FIG. 2C and (2), (3) of FIG. 2C, the operations of (1) to (3) of FIGS. 2A and 2B are repeated. As a result, the molten pool moves forward in the welding direction, and the molten pool is cooled behind it to form a welding bead.

At this time, there may be a configuration such that the pulse width of the pulse current 1 passed through the welding wire 22 is changed by a command from the control unit 60. Employing this configuration allows appropriately controlling the ratio between the time devoted to cleaning and the time devoted to welding.

Alternatively, a pulse current may be passed only through the welding wire 24, or a pulse current may be passed through the welding wire 24 together with the welding wire 22. When a pulse current is passed through both the welding wires 22, 24, both pulse currents can be synchronized and the phase and pulse width can be set to different values from each other to better control the attraction between the arcs of the welding wires 22, 24.

For example, when a pulse current is passed through both the welding wires 22, 24, both of the pulse currents are synchronized, and the peak current value of the pulse current passed through the welding wire 24 and the base current value of the pulse current passed through the welding wire 22 are set to be approximately equal. That is, a great difference is set between the peak current value of the pulse current passed through the welding wire 22 and the base current value of the pulse current passed through the welding wire 24, so that the attraction between the arcs of the welding wires 22, 24 can further be increased.

As described above, in the MIG welding method according to this embodiment, the surfaces of the steel plates 1, 1 in front of the welding direction of the molten pool on the welding line are cleaned in advance by an arc using welding wires 22, 24, which are the same consumable electrodes as the conventional ones, so that the arcs of the welding wires 22, 24 are always concentrated into the molten pool during welding. That is, the heat generated by the arcs of the welding wires 22, 24 can be concentrated in the molten pool and its surroundings, and the portion around the molten pool of the steel plates 1, 1 can be reliably heated.

As a result, low-cost, stable and highly wettable welding is performed, and a high current is not required because the amount of increase in the pulse current 1 passed through the welding wire 22 on the welding direction backward side during welding is only the amount that contributes to welding. Since the pair of welding wires 22, 24 are both consumable electrodes, the droplet transfer of both welding wires 22, 24 achieves a welding with high efficiency.

In addition, in the MIG welding method according to this embodiment, 100% inert gas (100% Ar) is used as the shield gas G supplied from the shield gas supply unit 30, so that the steel plate 1 as the metal member to be welded can be welded without being oxidized at all.

As described above, the MIG welding method according to this embodiment does not oxidize the metal member to be welded, which is the object of welding, at all, so that it also can be applied to welding of high-grade metal members to be welded such as Ni alloy, Ti alloy and Al alloy, which are not allowed to be oxidized.

The description of the embodiment according to the present disclosure is completed here, but the embodiment is not limited to the above, and various modifications can be made without departing from the scope of the present disclosure. For example, in the above embodiment, the description is made of the case in which the present disclosure is applied to the I-shaped groove 1a of the steel plates 1, 1 as butt welding as an example, but it can also be applied to fillet welding.

A first aspect of the present disclosure is a MIG welding method that forms a molten pool on a metal member to be welded, the MIG welding method including: placing a pair of MIG electrodes whose current values are individually variable and that include at least one MIG electrode through which a pulse current is passed; and repeating a first operation and a second operation, the first operation including passing a current having substantially the same current value through the pair of MIG electrodes while the pair of MIG electrodes is moved in a welding direction, so that an arc of a first MIG electrode of the pair of MIG electrodes generates a cathode spot in front of the molten pool in a moving direction, and the arc removes an oxide on a surface of the metal member to be welded, the second operation including: passing a pulse current having a higher current value than that of the first MIG electrode through a second MIG electrode of the pair of MIG electrodes, so that cathode spots are each generated within the molten pool to newly form a molten pool; and performing welding within an area while a cathode spot is moved to the newly formed molten pool, the area being an area where the oxide on the surface of the metal member to be welded is removed.

In the first aspect of the present disclosure, the pulse current passed through the second MIG electrode on the welding direction backward side need be increased only by the amount that contributes to welding, and thus does not require a high current. In addition, the pair of MIG electrodes are both consumable electrodes, so that the droplet transfer of both MIG electrodes achieves welding with high efficiency.

In a second aspect of the present disclosure, the pair of MIG electrodes are placed along a welding line of the metal member to be welded; in the first operation, a current having substantially the same current value is passed through the pair of MIG electrodes, so that an arc of a first MIG electrode of the pair of MIG electrodes generates a cathode spot in front of the molten pool in a welding direction and cleaning action of the arc removes an oxide on a surface of the metal member to be welded, the first MIG electrode being located on the forward side in a welding direction; and in the second operation, a pulse current having a current value higher than that of the first MIG electrode is passed through the second MIG electrode of the pair of MIG electrodes, so that each arc of the pair of MIG electrodes generates a cathode spot within the molten pool to newly form a molten pool, and welding is performed within an area while the pair of MIG electrodes are advanced in the welding direction to move a cathode spot to the newly formed molten pool, the area being an area where the oxide on the surface of the metal member to be welded is removed.

In the second aspect of the present disclosure, the arc of the first MIG electrode, located on the forward side in the welding direction, of the pair of MIG electrodes, which are the same consumable electrode as the conventional one, cleans the oxide on the surface of the metal member to be welded, in advance. Therefore, each arc of the pair of MIG electrodes is always concentrated into the molten pool during welding, that is, the heat generated by each arc of the pair of MIG electrodes is concentrated in the molten pool and its surroundings. This can reliably heat the portion around the molten pool on the surface of the metal member to be welded.

In a third aspect of the present disclosure, a pulse width of a pulse current passed through one of the pair of MIG electrodes is variable.

In the third aspect of the present disclosure, the ratio between the time devoted to cleaning and the time devoted to welding can be appropriately controlled.

In a fourth aspect of the present disclosure, currents passed through the pair of MIG electrodes are both pulse currents. In the fourth aspect of the present disclosure, both of the pulse currents are synchronized and the phase and pulse width are set to different values from each other, which can better control the attraction between the arcs of the pair of MIG electrodes.

In a fifth aspect of the present disclosure, individual pulse currents passed through the pair of MIG electrodes are synchronized with each other, a peak current value of a pulse current passed through a first MIG electrode and a peak current value of a pulse current passed through a second MIG electrode are different from each other, and a base current value of a pulse current passed through a first MIG electrode and a base current value of a pulse current passed through a second MIG electrode are different from each other, and a peak current value of a pulse current passed through a first MIG electrode of the pair of MIG electrodes is made substantially equal to a base current value of a pulse current passed through a second MIG electrode of the pair of MIG electrodes.

In the fifth aspect of the present disclosure, individual pulse currents passed through the pair of MIG electrodes are synchronized with each other, a peak current value of a pulse current passed through a first MIG electrode and a peak current value of a pulse current passed through a second MIG electrode are different from each other, and a base current value of a pulse current passed through a first MIG electrode and a base current value of a pulse current passed through a second MIG electrode are different from each other, and a peak current value of a pulse current passed through a first MIG electrode is set substantially equal to a base current value of a pulse current passed through a second MIG electrode. In other words, there is set a great difference between the peak current value of the pulse current passed through a second MIG electrode and the base current value of the pulse current passed through a first MIG electrode, so that the attraction between the arcs of the pair of MIG electrodes can be further increased.

A sixth aspect of the present disclosure is a MIG welding device that forms a molten pool on a metal member to be welded, the MIG welding device including: a pair of MIG electrodes whose current values are individually variable and that include at least one MIG electrode through which a pulse current is passed; a moving unit that moves the pair of MIG electrodes in a welding direction; a gas supply unit that supplies a shield gas between the pair of MIG electrodes and the metal member to be welded; a control unit that controls welding by the pair of MIG electrodes and movement of the pair of MIG electrodes by the moving unit, wherein the control unit repeatedly executes: a first control that includes passing a current having substantially the same current value through the pair of MIG electrodes, so that an arc of a first MIG electrode of the pair of MIG electrodes generates a cathode spot in front of the molten pool in a moving direction, and the arc removes an oxide on a surface of the metal member to be welded; and a second control that includes: passing a pulse current having a higher current value than that of the first MIG electrode through a second MIG electrode of the pair of MIG electrodes, so that cathode spots are each generated within the molten pool to newly form a molten pool; and performing welding within an area while the pair of MIG electrodes are moved in the welding direction by the moving unit to move a cathode spot to the newly formed molten pool, the area being an area where the oxide on the surface of the metal member to be welded is removed.

In the sixth aspect of the present disclosure, the pulse current passed through the second MIG electrode on the welding direction backward side need be increased only by the amount that contributes to welding, so that a high current is not required. In addition, the pair of MIG electrodes are both consumable electrodes, so that the droplet transfer of both MIG electrodes achieves welding with high efficiency.

EXPLANATION OF REFERENCE SIGNS 1 steel plate (metal member to be welded)
10 MIG welding device
20 welding wire supply unit
21 welding wire coil
22 welding wire (second MIG electrode)
24 welding wire (first MIG electrode)
30 shield gas supply unit
40 welding torch
50 moving unit
60 control unit

The invention claimed is:
1. A MIG welding method that forms a molten pool on a metal member to be welded, the MIG welding method comprising:

placing a pair of MIG electrodes whose current values are individually variable and that include at least one MIG electrode through which a pulse current is passed; and repeating a first operation and a second operation, the first operation including passing a current having substantially the same current value through the pair of MIG electrodes while the pair of MIG electrodes is moved in a welding direction, so that an arc of a first MIG electrode of the pair of MIG electrodes generates a cathode spot in front of the molten pool in a moving direction, and the arc removes an oxide on a surface of the metal member to be welded, and the second operation including: passing a pulse current having a higher current value than that of the first MIG electrode through a second MIG electrode of the pair of MIG electrodes, so that cathode spots are each generated within the molten pool to newly form a molten pool; and performing welding within an area while a cathode spot is moved to the newly formed molten pool, the area being an area where the oxide on the surface of the metal member to be welded is removed.

2. The MIG welding method according to claim 1, wherein:

the pair of MIG electrodes are placed along a welding line of the metal member to be welded;

in the first operation, a current having substantially the same current value is passed through the pair of MIG electrodes, so that an arc of a first MIG electrode of the pair of MIG electrodes generates a cathode spot in front of the molten pool in a welding direction and cleaning action of the arc removes an oxide on a surface of the metal member to be welded, the first MIG electrode being located on a forward side in the welding direction; and in the second operation, a pulse current having a current value higher than that of the first MIG electrode is passed through the second MIG electrode of the pair of MIG electrodes, so that each arc of the pair of MIG electrodes generates a cathode spot within the molten pool to newly form a molten pool, and welding is performed within an area while the pair of MIG electrodes are advanced in the welding direction to move a cathode spot to the newly formed molten pool, the area being an area where the oxide on the surface of the metal member to be welded is removed.

3. The MIG welding method according to claim 1, wherein a pulse width of a pulse current passed through one of the pair of MIG electrodes is variable.

4. The MIG welding method according to claim 2, wherein a pulse width of a pulse current passed through one of the pair of MIG electrodes is variable.

5. The MIG welding method according to claim 1, wherein currents passed through the pair of MIG electrodes are both pulse currents.

6. The MIG welding method according to claim 2, wherein currents passed through the pair of MIG electrodes are both pulse currents.

7. The MIG welding method according to claim 3, wherein currents passed through the pair of MIG electrodes are both pulse currents.

8. The MIG welding method according to claim 4, wherein currents passed through the pair of MIG electrodes are both pulse currents.

9. The MIG welding method according to claim 1, wherein individual pulse currents passed through the pair of MIG electrodes are synchronized with each other, a peak current value of a pulse current passed through a first MIG electrode and a peak current value of a pulse current passed through a second MIG electrode are different from each other, and a base current value of a pulse current passed through a first MIG electrode and a base current value of a pulse current passed through a second MIG electrode are different from each other, and a peak current value of a pulse current passed through a first MIG electrode of the pair of MIG electrodes is made substantially equal to a base current value of a pulse current passed through a second MIG electrode of the pair of MIG electrodes.

10. The MIG welding method according to claim 2, wherein individual pulse currents passed through the pair of MIG electrodes are synchronized with each other, a peak current value of a pulse current passed through a first MIG electrode and a peak current value of a pulse current passed through a second MIG electrode are different from each other, and a base current value of a pulse current passed through a first MIG electrode and a base current value of a pulse current passed through a second MIG electrode are different from each other, and a peak current value of a pulse current passed through a first MIG electrode of the pair of MIG electrodes is made substantially equal to a base current value of a pulse current passed through a second MIG electrode of the pair of MIG electrodes.

11. The MIG welding method according to claim 3, wherein individual pulse currents passed through the pair of MIG electrodes are synchronized with each other, a peak current value of a pulse current passed through a first MIG electrode and a peak current value of a pulse current passed through a second MIG electrode are different from each other, and a base current value of a pulse current passed through a first MIG electrode and a base current value of a pulse current passed through a second MIG electrode are different from each other, and a peak current value of a pulse current passed through a first MIG electrode of the pair of MIG electrodes is made substantially equal to a base current value of a pulse current passed through a second MIG electrode of the pair of MIG electrodes.

12. The MIG welding method according to claim 4, wherein individual pulse currents passed through the pair of MIG electrodes are synchronized with each other, a peak current value of a pulse current passed through a first MIG electrode and a peak current value of a pulse current passed through a second MIG electrode are different from each other, and a base current value of a pulse current passed through a first MIG electrode and a base current value of a pulse current passed through a second MIG electrode are different from each other, and a peak current value of a pulse current passed through a first MIG electrode of the pair of MIG electrodes is made substantially equal to a base current value of a pulse current passed through a second MIG electrode of the pair of MIG electrodes.

13. The MIG welding method according to claim 5, wherein individual pulse currents passed through the pair of MIG electrodes are synchronized with each other, a peak current value of a pulse current passed through a first MIG electrode and a peak current value of a pulse current passed through a second MIG electrode are different from each other, and a base current value of a pulse current passed through a first MIG electrode and a base current value of a pulse current passed through a second MIG electrode are different from each other, and a peak current value of a pulse current passed through a first MIG electrode of the pair of MIG electrodes is made substantially equal to a base current value of a pulse current passed through a second MIG electrode of the pair of MIG electrodes.

14. The MIG welding method according to claim 6, wherein individual pulse currents passed through the pair of MIG electrodes are synchronized with each other, a peak current value of a pulse current passed through a first MIG electrode and a peak current value of a pulse current passed through a second MIG electrode are different from each other, and a base current value of a pulse current passed through a first MIG electrode and a base current value of a pulse current passed through a second MIG electrode are different from each other, and a peak current value of a pulse current passed through a first MIG electrode of the pair of MIG electrodes is made substantially equal to a base current value of a pulse current passed through a second MIG electrode of the pair of MIG electrodes.

15. The MIG welding method according to claim 7, wherein individual pulse currents passed through the pair of MIG electrodes are synchronized with each other, a peak current value of a pulse current passed through a first MIG electrode and a peak current value of a pulse current passed through a second MIG electrode are different from each other, and a base current value of a pulse current passed through a first MIG electrode and a base current value of a pulse current passed through a second MIG electrode are different from each other, and a peak current value of a pulse current passed through a first MIG electrode of the pair of MIG electrodes is made substantially equal to a base current value of a pulse current passed through a second MIG electrode of the pair of MIG electrodes.

16. The MIG welding method according to claim 8, wherein individual pulse currents passed through the pair of MIG electrodes are synchronized with each other, a peak current value of a pulse current passed through a first MIG electrode and a peak current value of a pulse current passed through a second MIG electrode are different from each other, and a base current value of a pulse current passed through a first MIG electrode and a base current value of a pulse current passed through a second MIG electrode are different from each other, and a peak current value of a pulse current passed through a first MIG electrode of the pair of MIG electrodes is made substantially equal to a base current value of a pulse current passed through a second MIG electrode of the pair of MIG electrodes.

17. A MIG welding device that forms a molten pool on a metal member to be welded, the MIG welding device comprising:

a pair of MIG electrodes whose current values are individually variable and that include at least one MIG electrode through which a pulse current is passed;

a moving unit that moves the pair of MIG electrodes in a welding direction;

a gas supply unit that supplies a shield gas between the pair of MIG electrodes and the metal member to be welded; and a control unit that controls welding by the pair of MIG electrodes and movement of the pair of MIG electrodes by the moving unit, wherein the control unit repeatedly executes:

a first control that includes passing a current having substantially the same current value through the pair of MIG electrodes, so that an arc of a first MIG electrode of the pair of MIG electrodes generates a cathode spot in front of the molten pool in a moving direction, and the arc removes an oxide on a surface of the metal member to be welded; and a second control that includes: passing a pulse current having a higher current value than that of the first MIG electrode through a second MIG electrode of the pair of MIG electrodes, so that cathode spots are each generated within the molten pool to newly form a molten pool; and performing welding within an area while the pair of MIG electrodes are moved in the welding direction by the moving unit to move a cathode spot to the newly formed molten pool, the area being an area where the oxide on the surface of the metal member to be welded is removed.

* * * * *